United States Patent
Moreman

(10) Patent No.: US 9,787,503 B2
(45) Date of Patent: Oct. 10, 2017

(54) UTILIZING PROXY INTERNET PROTOCOL ADDRESSING IN A GATEWAY FOR COMMUNICATING WITH MULTIPLE SERVICE PROVIDER NETWORKS

(75) Inventor: Charles Moreman, Grayson, GA (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 13/179,899

(22) Filed: Jul. 11, 2011

(65) Prior Publication Data

US 2012/0011274 A1    Jan. 12, 2012

Related U.S. Application Data

(60) Provisional application No. 61/363,517, filed on Jul. 12, 2010.

(51) Int. Cl.

| | |
|---|---|
| *G06F 15/16* | (2006.01) |
| *H04L 12/66* | (2006.01) |
| *H04L 12/28* | (2006.01) |
| *H04L 12/701* | (2013.01) |
| *H04L 29/06* | (2006.01) |
| *H04L 29/12* | (2006.01) |

(52) U.S. Cl.
CPC ............ *H04L 12/66* (2013.01); *H04L 12/287* (2013.01); *H04L 45/00* (2013.01); *H04L 61/2528* (2013.01); *H04L 65/104* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 8,289,958 | B1 * | 10/2012 | Narayanan | ................... 370/389 |
| 2003/0031180 | A1 * | 2/2003 | Datta | ................. H04L 12/5692 |
| | | | | 370/392 |
| 2003/0172170 | A1 * | 9/2003 | Johnson | .............. H04L 61/2015 |
| | | | | 709/230 |

(Continued)

OTHER PUBLICATIONS

Draves, R., "Default Address Selection for Internet Protocol version 6 (IPv6)," Network Working Group, Feb. 2003, http://www.ietf.org/rfc/rfc3484.txt, 23 pages.

*Primary Examiner* — Viet Vu

(74) *Attorney, Agent, or Firm* — Merchant & Gould P.C.

(57) ABSTRACT

A gateway utilizes a proxy Internet Protocol ("IP") addressing scheme to communicate with disparate network service providers. A first IP address prefix may be received from an alternative service provider in communication with the gateway. The gateway may assign a proxy IP address from the first IP address prefix for computing devices in communication with the gateway. A second IP address prefix may be received from a master service provider in communication with the gateway. The computing devices may be provisioned with an actual IP address assigned from the second IP address prefix. The gateway may then route data traffic utilizing the assigned proxy IP address between the alternative service provider and the computing devices utilizing the actual assigned proxy IP address. The gateway may further route data traffic utilizing the actual assigned IP address between the master service provider and the computing devices utilizing the actual assigned IP address.

18 Claims, 3 Drawing Sheets

(56) References Cited

U.S. PATENT DOCUMENTS

| | | | |
|---|---|---|---|
| 2004/0120260 A1* | 6/2004 | Bernier et al. | 370/252 |
| 2005/0286553 A1* | 12/2005 | Wetterwald et al. | 370/466 |
| 2007/0081541 A1* | 4/2007 | Umekage et al. | 370/395.2 |
| 2008/0201478 A1* | 8/2008 | Yao et al. | 709/227 |
| 2009/0201911 A1* | 8/2009 | DuPertuis et al. | 370/352 |
| 2010/0290474 A1* | 11/2010 | Kaippallimalil | H04L 12/2874 370/395.53 |

* cited by examiner

UTILIZING PROXY INTERNET PROTOCOL ADDRESSING IN A GATEWAY FOR COMMUNICATING WITH MULTIPLE SERVICE PROVIDER NETWORKS

CROSS-REFERENCE TO RELATED APPLICATIONS

This utility application claims the benefit under 35 U.S.C. §119(e) of U.S. Provisional Patent Application No. 61/363,517 filed on Jul. 12, 2010.

BACKGROUND

Gateways are increasingly being utilized in residential computing environment to support Internet Protocol ("IP") connectivity between home computing devices and multiple service provider networks. For example, a residential customer may concurrently subscribe to a managed IP video service and a public Internet service from two different service providers for use by one or multiple customer premises equipment ("CPE") devices connected to the gateway. In order to provide communication between the CPE devices and multiple service providers, gateways must be configured with multiple wide area network (WAN) interfaces, each of which is utilized in establishing a connection with a specific service provider. Each service provider must also assign separate (and distinct) IP addresses to a CPE device for enabling communication through a gateway. Currently however, CPE devices are very inefficient in communicating with service providers after having been assigned multiple IP addresses because the CPE devices are unable to identify which assigned IP address is associated with a particular service provider. Thus, a CPE device, having been assigned one IP address from a video service provider and a different IP address from a public Internet service provider, is forced to "guess" or randomly choose an IP address for use in sending data to a particular service provider. If the CPE device makes the wrong guess, it may use the IP address associated with the video service provider to send data destined for the public Internet service through a gateway. As a result, the receiving service provider (e.g., the video service provider), expecting data to be sent using a different IP address, would be unable to understand the incoming data and a connection with the CPE device would not be established. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing proxy Internet Protocol ("IP") addressing in a gateway for communicating with multiple disparate service providers. A first IP address prefix, indicating a range of IP addresses, may be received from an alternative service provider in communication with the gateway. The gateway may assign a proxy IP address from the first IP address prefix for one or more computing devices in communication with the gateway. A second IP address prefix, indicating a range of IP addresses, may be received from a master service provider in communication with the gateway. Each of the one or more computing devices may be provisioned with an actual IP address assigned from the second IP address prefix from the master service provider. The gateway may then route data traffic between the alternative service provider and the one or more computing devices utilizing both the assigned proxy IP address and the actual assigned proxy IP address. The gateway may further route data traffic utilizing the actual assigned IP address between the master service provider and the one or more computing devices utilizing the actual assigned IP address.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing proxy Internet Protocol ("IP") addressing in a gateway for communicating with multiple disparate service providers. A first IP address prefix, indicating a range of IP addresses, may be received from an alternative service provider in communication with the gateway. The gateway may assign a proxy IP address from the first IP address prefix for one or more computing devices in communication with the gateway. A second IP address prefix, indicating a range of IP addresses, may be received from a master service provider in communication with the gateway. Each of the one or more computing devices may be provisioned with an actual IP address assigned from the second IP address prefix from the master service provider. The gateway may then route data traffic between the alternative service provider and the one or more computing devices utilizing both the assigned proxy IP address and the actual assigned proxy IP address. The gateway may further route data traffic utilizing the actual assigned IP address between the master service provider and the one or more computing devices utilizing the actual assigned IP address.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
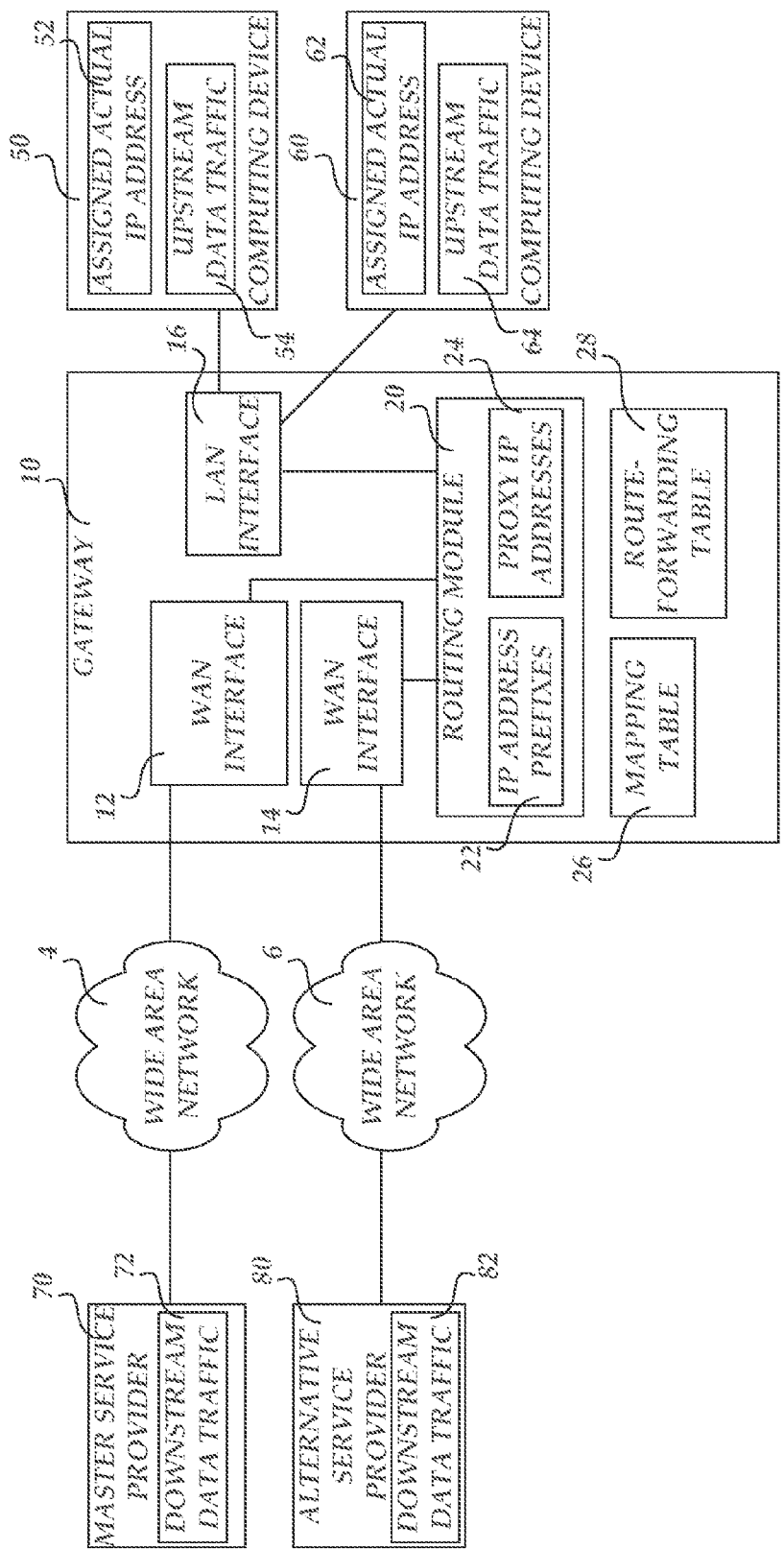
FIG. 1 is a block diagram illustrating a network architecture for utilizing proxy Internet protocol addressing in a gateway for communicating with multiple disparate service providers, in accordance with an embodiment.

Referring now to the drawings, in which like numerals represent like elements through the several figures, various aspects of the present invention will be described. FIG. 1 is a block diagram illustrating a network architecture for utilizing proxy Internet protocol addressing in a gateway for communicating with multiple disparate service providers, in accordance with an embodiment.

The network architecture includes a computing device 50 and a computing device 60 which communicate upstream data traffic 54 and upstream data traffic 64, respectively, a master service provider 70 and an alternative service provider 80 through a gateway 10. The computing devices 50 and 60 may comprise general purpose desktop, laptop, handheld, tablet, or other types of computers capable of executing one or more applications. The computing devices 50 and 60 also include actual Internet protocol ("IP") addresses 52 and 62 which are assigned by the gateway 10 from an IP prefix provided from the master service provider 70. In accordance with various embodiments, the upstream data traffic 54 and the upstream data traffic 64 may comprise, without limitation, public Internet data traffic, IP video data traffic and voice over IP data traffic destined for the master service provider 70 or the alternative service provider 80.

The gateway 10 comprises a wide area network ("WAN") interface 12, a WAN interface 14, a LAN interface 16, a routing module 20, a mapping table 26 and a route-forwarding table 28. The gateway 10 may receive the upstream data traffic 54 and 64 from the computing devices 50 and 60 over the LAN interface 16. It should be understood that the LAN interface 16 may comprise multiple ports for establishing connections with the computing device 50, the computing device 60 and the routing module 20. The WAN interface 12 is in communication with the routing module 20 and the master service provider 70 over a WAN 4. The WAN interface 14 is in communication with the routing module 20 and an alternative service provider 80 over the WAN 6. The routing module 20 may comprise IP address prefixes 22 and proxy IP addresses 24. In accordance with an embodiment, the IP address prefixes 22 may comprise IPv6 address prefixes assigned by the alternative service provider 80 and IPv6 address prefixes assigned by the master service provider 70. The proxy IP addresses 24 may comprise logical IPv6 addresses which are assigned by the gateway 10 and which may be based on the IPv6 address prefixes assigned by the alternative service provider 80. In accordance with various embodiments, the routing module 20 may comprise a software application executed on the gateway 10 which is configured to utilize proxy IP addressing to communicate upstream and downstream data traffic between computing devices and multiple disparate service providers and further configured to utilize actual IP addressing to communicate upstream and downstream data traffic between computing devices and multiple disparate service providers. In accordance with an embodiment, the mapping table 26 may comprise information which may be utilized by the routing module 20 to determine corresponding actual IP addresses and substitute the corresponding actual IP addresses in downstream data traffic. In accordance with an embodiment, the route-forwarding table 28 may comprise information which may be utilized by the routing module 20 to compare with a destination IP address in upstream data traffic and determine, based on the comparison, whether to direct the upstream data traffic to the alternative service provider 80. The aforementioned functionality of the routing module 20 will be described in greater detail below with respect to FIGS. 2 and 3.

The master service provider 70 is in communication with the gateway 10 over the WAN 4 and comprises downstream data traffic 72. In accordance with an embodiment, the master service provider 70 may be utilized as an addressing service provider which provides an IPv6 address 22 used by the gateway 10 to create IPv6 addresses provisioned into the computing devices 50 and 60. In accordance with an embodiment, the master service provider 70 may comprise a public Internet service provider and the downstream data traffic 72 may comprise public Internet data traffic destined for one or both of the computing devices 50 and 60.

The alternative service provider 80 is in communication with the gateway 10 over the WAN 6 and comprises downstream data traffic 82. In accordance with an embodiment, and as will be described in greater detail below in the discussion of FIG. 2, the downstream data traffic 82 may be routed to the computing devices 50 and 60 by the routing module 20 (in the gateway 10) utilizing the proxy IP addresses 24. In accordance with an embodiment, the alternative service provider 80 may comprise an IP video service provider and the downstream data traffic 82 may comprise IP video data traffic destined for one or both of the computing devices 50 and 60.

Figure 2:
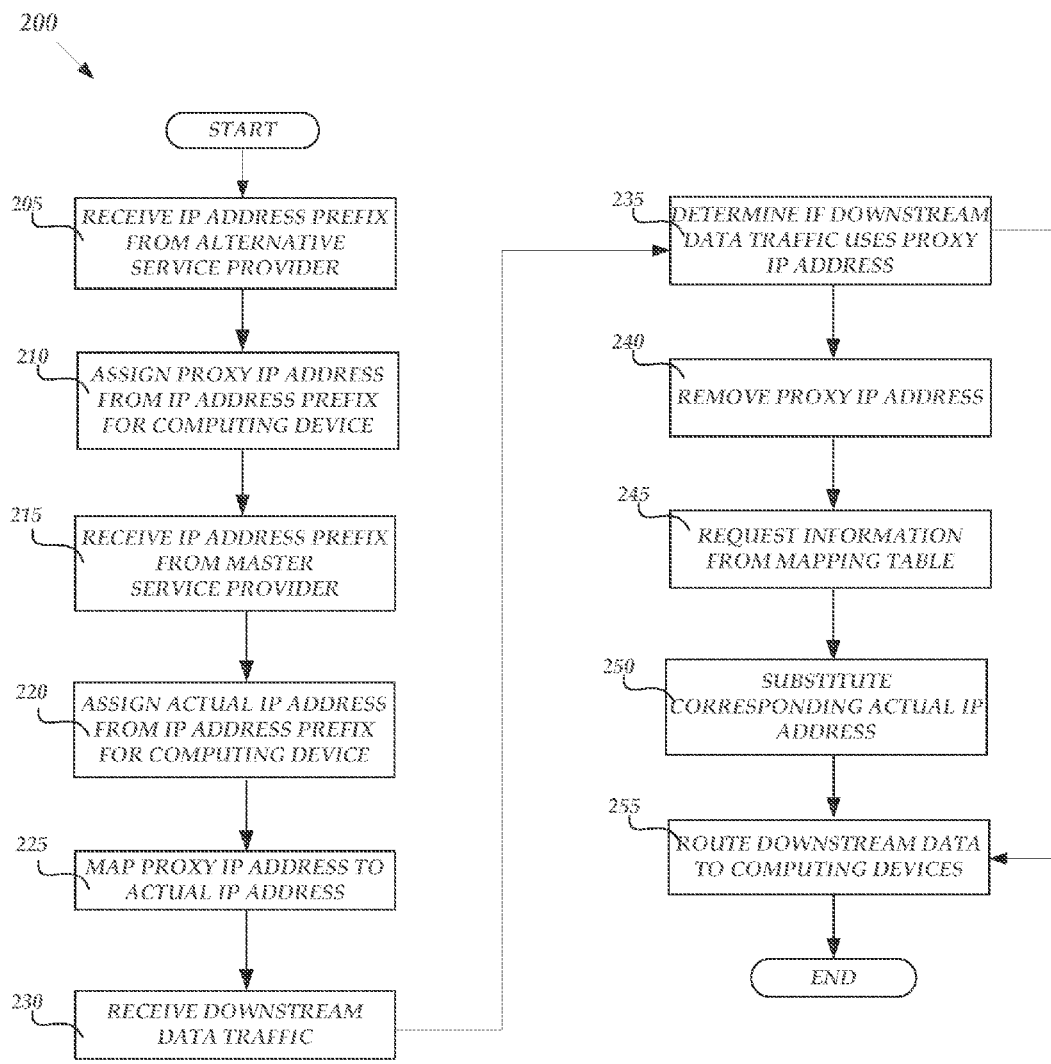
FIG. 2 is a flow diagram illustrating a routine for utilizing proxy Internet protocol addressing in a gateway to communicate downstream data traffic from multiple disparate service providers, in accordance an embodiment.

FIG. 2 is a flow diagram illustrating a routine 200 for utilizing proxy IP addressing in a gateway to communicate downstream data traffic from multiple disparate service providers, in accordance an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 2-3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 200 begins at operation 205 where the routing module 20, executing on the gateway 10, may receive an IP address prefix 22 from the alternative service provider 80. For example, the alternative service provider 80 may assign an IPv6 prefix such as 2001:0080::/64.

From operation 205, the routine 200 continues to operation 210 where the routing module 20, executing on the gateway 10, may assign a proxy IP address 24 from the IP address prefix 22, corresponding to the alternative service provider 80, for use in sending the downstream data traffic 82 to the computing devices 50 and 60. For example, the proxy IP address 24 may comprise the logical IPv6 address 2001:0080::0050 (for the computing device 50) and the logical IPv6 address 2001:0080::0060 (for the computing device 60) which correspond to the IPv6 prefix 2001:0080::/64.

From operation 210, the routine 200 continues to operation 215 where the routing module 20, executing on the gateway 10, may receive an IP address prefix 22 from the master service provider 70. For example, the master service provider 70 may assign an IPv6 prefix such as 2001:0070::/64.

From operation 215, the routine 200 continues to operation 220 where the routing module 20, executing on the gateway 10, may assign the actual IP addresses 52 and 62 from the IP address prefix 22 for the computing devices 50 and or 60. For example, the actual IP address 52 may comprise the IPv6 address 2001:0070::0050 (for the computing device 50) and the actual IPv6 address 62 may comprise the IPv6 address 2001:0070::0060 (for the computing device 60) which correspond to the IPv6 prefix 2001:0070::/64.

From operation 220, the routine 200 continues to operation 225 where the routing module 20, executing on the gateway 10, may map a proxy IP address 24 to the actual IP addresses 52 and 62 assigned by the gateway 10 from the IP address prefix 22 received from the alternative service provider 80 at operation 205. It should be understood that in mapping the proxy IP address, the routing module 20 may be operative to create an entry in the mapping table 26. It should further be understood that the mapping of a proxy IP address 24 to the actual IP addresses 52 and 62 may comprise a one-to-one mapping of a logical IPv6 address to an actual IPv6 address. For example, logical IPv6 address 2001:0080::0050 utilized for sending the downstream data traffic from the alternative service provider to the computing device 50 may be mapped to actual IP address 2001:0070::0050 assigned by gateway 10 from the IP address prefix 22 from by the master service provider 70.

From operation 225, the routine 200 continues to operation 230 where the routing module 20, executing on the gateway 10, may receive downstream data traffic (i.e., either the downstream data traffic 82 from the alternative service provider 80 or the downstream data traffic 72 from the master service provider 70).

From operation 230, the routine 200 continues to operation 235 where the routing module 20, executing on the gateway 10, may determine if the downstream data traffic, received at operation 225, uses a proxy IP address (e.g., the proxy IP address 24).

If, at operation 235, it is determined that the downstream data traffic uses a proxy IP address, then the routine 200 continues to operation 240. If, at operation 235, it is determined that the downstream data traffic does not use a proxy IP address, then the routine 200 branches from operation 235 to operation 255.

At operation 240, the routing module 20, executing on the gateway 10, may remove the proxy IP address 24 received in the downstream data traffic 82.

From operation 240, the routine 200 continues to operation 245 where the routing module 20, executing on the gateway 10, may request information from the mapping table 26 to determine a corresponding actual IP address.

From operation 245, the routine 200 continues to operation 250 where the routing module 20, executing on the gateway 10, may substitute the corresponding actual IP address 52 or 62 in the downstream data traffic 82.

From operation 250 or from operation 235, the routine 200 continues to operation 255 where the routing module 20, executing on the gateway 10 may route downstream data traffic to the computing devices 50 and 60 using the assigned actual IP address 52 or 62. In particular, if it determined, at operation 235, that the downstream data traffic uses a proxy IP address, then the routing module 20, executing on the gateway 10, may route the downstream data traffic 82 from the alternative service provider 80 to the computing devices 50 and 60 utilizing the assigned actual IP address 52 or the assigned actual IP address 62. In particular, the downstream data traffic 82 may be routed to the LAN interface 16 in the gateway 10 so that it may be received by the computing devices 50 and 60. Alternatively, if it is determined, at operation 235, that the downstream data traffic does not use a proxy IP address, then the routing module 20, executing on the gateway 10, may route the downstream data traffic 72 from the master service provider 70 to one or more of the computing devices 50 and 60. For example, the downstream data traffic 72 may be routed from the master service provider 70 through the WAN interface 12, through the routing module 20 to the LAN interface 16, and finally to the computing devices 50 and 60 using the actual IP address 52 or 62 without the IP address mapping and substitution discussed above with respect to operations 225, 240, 245 and 250. From operation 255, the routine 200 then ends.

Figure 3:
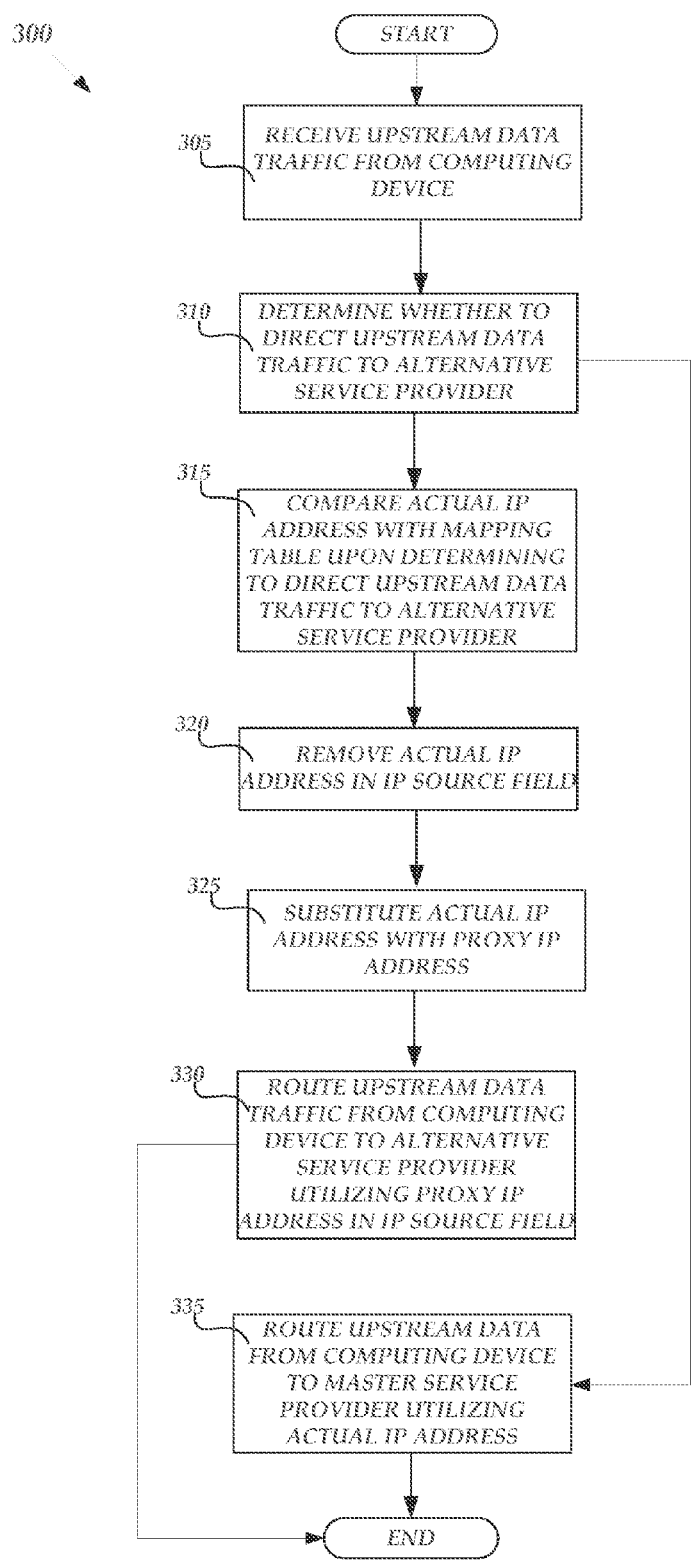
FIG. 3 is a flow diagram illustrating a routine for utilizing proxy Internet protocol addressing in a gateway to communicate upstream data traffic to multiple disparate service providers, in accordance an embodiment.

FIG. 3 is a flow diagram illustrating a routine 300 for utilizing proxy IP addressing in a gateway to communicate upstream data traffic to multiple disparate service providers, in accordance an embodiment. The routine 300 begins at operation 305 where the gateway 10 may receive the upstream data traffic 54 from the computing device 50 and/or the upstream data traffic 64 from the computing device 60. In particular, the computing device 50 may send the upstream data traffic 54 to the gateway 10 using the actual IP address 52 assigned by the gateway 10 from the IP address prefix 22 provided by the master service provider 70. Similarly, the computing device 60 may send the upstream data traffic 64 to the gateway 10 using the actual IP address 62 assigned by gateway 10 provided by the master service provider 70.

From operation 305, the routine 300 continues to operation 310 where the routing module 20, executing on the gateway 10, may determine if the upstream data traffic 54 (or the upstream data traffic 64) should be directed to the alternative service provider 80 or should be directed to the master service provider 70. In particular, the routing module 20 may be configured to examine the destination IP address of the upstream data traffic, compare the destination IP address to information in the route-forwarding table 28 and determine, based on the comparison (i.e., either through exact matches, partial matches or the absence of matches between the destination IP address and the information in the route-forwarding table 28), if the upstream data traffic should be directed to the alternative service provider 80 or to the master service provider 70.

From operation 310, the routine 300 continues to operation 315 upon determining that the upstream data traffic should be directed to the alternative service provider 80. At operation 315, the routing module 20, executing on the gateway 10, may compare the actual IP address in an IP source field, for either the upstream data traffic 54 or the upstream data traffic 64, with the information in the mapping table 26. In particular, the routing module 20 may be configured to read the mapping table 26 and retrieve the proxy IP address 24 that corresponds to the actual IP address in the aforementioned IP source field for either the upstream data traffic 54 or the upstream data traffic 64.

From operation 315, the routine 300 continues to operation 320 where the routing module 20, executing on the gateway 10, may remove the actual IP address 52 or 62 in the IP source field.

From operation 320, the routine 300 continues to operation 325 where the routing module 20, executing on the gateway 10, may substitute the actual IP address in the aforementioned IP source field 52 or 62 with a proxy IP address 24. For example, the routing module 20 may apply Network Address Translation ("NAT") or Network Address Port Translation ("NAPT") rules to the upstream data traffic 54 and/or 64 and may substitute the IPv6 address: 2001: 0070::0050, utilized by the computing device 50, with the proxy or logical IPv6 address: 2001:0080::0050.

From operation 325, the routine 300 continues to operation 330 where the routing module 20, executing on the gateway 10, may route the upstream data traffic 54 from the computing device 50 to the alternative service provider 80, utilizing a proxy IP address 24 in the IP source field. Similarly, the routing module 20, executing on the gateway 10, may route the upstream data traffic 64 from the computing device 60 to the alternative service provider 80, utilizing a proxy IP address 24 in the IP source field. From operation 330, the routine 300 then ends.

Returning now to operation 310, upon determining that the upstream data traffic should be directed to the master service provider 70, the routine 300 branches from operation 310 to operation 335. At operation 335, the routing module 20, executing on the gateway 10, may route the upstream data traffic 54 received from the computing device 50 to the master service provider 70 upon determining (at operation 310) not to direct the upstream data traffic 54 to the alternative service provider 80. In particular, the upstream data traffic 54 may be routed to the destination IP address. The upstream data traffic 54 contains the actual source IP address 52 assigned by the gateway 10 from the IP address prefix 22 provided by the master service provider 70. Similarly, the routing module 20, executing on the gateway 10, may route the upstream data traffic 64 received from the computing device 60 to the master service provider 70 upon determining (at operation 310) not to direct the upstream data traffic 64 to the alternative service provider 80. In particular, the upstream data traffic 64 may be routed to the destination IP address. The upstream data traffic 64 contains the actual source IP address 62 assigned by the gateway 10 from the IP address prefix 22 provided by the master service provider 70. It should be understood that the actual IP addresses 52 and 62 may be contained within IP source fields of the upstream data traffic 54 and 64. From operation 335, the routine 300 then ends.

It should be understood, that in accordance with the various embodiments discussed herein, end-to-end connectivity between computing devices and an alternative service provider may be established without the problems associated the one-to-many addressing methods such as IPv4 NAPT. In particular, the use of the proxy or logical addressing within service provider prefixes may enable residential gateways to use business rules to populate the route-forwarding table 28 to determine how to route traffic. The use of proxy or logical addressing also enables computing devices to be assigned a single IPv6 address for use with multiple service providers.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of utilizing proxy Internet protocol (IP) addressing in a gateway for communicating with a plurality of different service providers, comprising:

receiving, at the gateway, a first IP address prefix from an alternative service provider in communication with the gateway over a first wide area network (WAN) interface of the gateway via a first WAN, the first IP address prefix comprising a first range of logical IP addresses provided by an internet protocol (IP) video provider;

assigning, within the gateway, a proxy IP address from the first IP address prefix for at least one computing device in communication with the gateway;

receiving, at the gateway, a second IP address prefix from a master service provider in communication with the gateway over a second WAN interface of the gateway via a second WAN, the second IP address prefix comprising a second range of actual IP addresses provided by a public internet service provider;

assigning, within the gateway, an actual IP address from the second IP address prefix for the at least one computing device in communication with the gateway, wherein the at least one computing device is provisioned with the actual IP address assigned from the second IP address prefix;

creating a mapping table and a route forwarding table at the gateway, the mapping table comprising a mapping of the proxy IP address and the actual IP address, the route forwarding table comprising information to compare with a destination IP address in an upstream data traffic and to determine, based on the comparison, whether to direct the upstream data traffic to the alternative service provider, wherein creating the mapping table comprises creating a one to one mapping of the proxy address and the actual IP address for each of the at least one computing device;

receiving, at the gateway, downstream data traffic;

determining a destination address for the downstream data traffic;

determining that the destination address is the proxy IP address;

performing, in response to the determination that the destination address is the proxy IP address, a lookup operation in the mapping table to determine the actual IP address corresponding to the proxy IP address; and updating the destination address of the downstream data traffic, wherein updating the downstream data traffic comprises replacing the proxy IP address in the destination address with the actual IP address determined by the lookup operation.

2. The method of claim 1, further comprising:

receiving, at the gateway, upstream data traffic from the at least one computing device, the downstream data traffic comprising a destination IP address field; and determining that the destination address in the destination IP field is associated with the alternative service provider.

3. The method of claim 2, further comprising:

determining, in response to the determination that the destination address is associated with the alternative service provider, a source IP address associated with the upstream data traffic;

removing the source IP address from the upstream data traffic;

performing a lookup operation in the mapping table to determine the proxy IP address corresponding to the source IP address; and substituting the source IP address in the source IP address field with the proxy IP address.

4. The method of claim 1, wherein assigning, within the gateway, a proxy IP address from the first IP address prefix corresponding to the alternative service provider for at least one computing device in communication with the gateway comprises assigning a logical Internet Protocol version 6 (IPv6) address from an IPv6 address prefix corresponding to the alternative service provider for the at least one computing device in communication with the gateway.

5. A gateway for utilizing proxy Internet protocol (IP) addressing to communicate with a plurality of different service providers, the gateway comprising:
- a first wide area network (WAN) interface in communication with an alternative service provider via a first WAN;
- a second WAN interface in communication with a master service provider via a second WAN;
- a local area network (LAN) interface in communication with a routing module;
- at least one computing device, in communication with the LAN interface;
- the routing module operative to:
   - receive a first IP address prefix from the alternative service provider over the first WAN interface, the first IP address prefix comprising a first range of logical IP addresses provided by an internet protocol (IP) video service provider;
   - assign a proxy IP address from the first IP address prefix for the at least one computing device;
   - receive a second IP address prefix from the master service provider over the second WAN interface, the second IP address prefix comprising a second range of actual IP addresses provided by a public internet service provider;
   - assign an actual IP address from the second IP address prefix for the at least one computing device, wherein the at least one computing device is provisioned with an actual IP address assigned from the second IP address prefix;
   - create a mapping table and a route forwarding table, the mapping table comprising a mapping of the proxy IP address and the actual IP address, the route forwarding table comprising information to compare with a destination IP address in an upstream data traffic and to determine, based on the comparison, whether to direct the upstream data traffic to the alternative service provider, wherein the routing module being operative to create the mapping table comprises the routing module being operative to create a one to one mapping of the proxy address and the actual IP address for the at least one computing device;
   - receive, at the gateway, downstream data traffic;
   - determine a destination address for the downstream data traffic;
   - determine that the destination address is the proxy IP address;
   - perform, in response to the determination that the destination address is the proxy IP address, a lookup operation in the mapping table to determine the actual IP address corresponding to the proxy IP address; and
   - update the destination address of the downstream data traffic, wherein updating the downstream data traffic comprises replacing the proxy IP address in the destination address with the actual IP address determined by the lookup operation.

6. The gateway of claim 5, wherein the routing module is further operative to:
- receive upstream data traffic from the at least one computing device, the upstream data traffic comprising a destination IP address field; and
- determine that the destination address in the destination IP field is associated with the alternative service provider.

7. The gateway of claim 6, wherein the routing module is further operative to:
- determine, in response to the determination that the destination address is associated with the alternative service provider, a source IP address associated with the upstream data traffic;
- remove the source IP address from the upstream data traffic;
- perform the lookup operation mapping table to determine the actual IP address corresponding to the source IP address; and
- substitute the source IP address in the source IP address field with the proxy IP address.

8. The gateway of claim 5, wherein the proxy IP address comprises a logical Internet Protocol version 6 (IPv6) address.

9. A method of utilizing proxy Internet protocol (IP) addressing in a gateway for communicating with a plurality of different service providers, the method comprising:
- receiving, at the gateway, upstream data traffic from at least one computing device, the gateway comprising a first wide area network (WAN) interface configured to communicate with an alternative service provider via a first WAN and a second WAN interface configured to communicate with a master service provider via a second WAN;
- determining, at the gateway, from a route forwarding table at the gateway, a destination address associated with the upstream data traffic, the route forwarding table comprising information to compare with a destination IP address in an upstream data traffic and to determine, based on the comparison, whether to direct the upstream data traffic to the alternative service provider;
- determining, at the gateway, whether the destination address associated with the upstream data traffic is to the alternative service provider;
- determining, by the gateway in response to the determination that the destination address is from the alternate service provider, an actual IP address in an IP source field in the upstream data traffic by performing a lookup operation in a mapping table, wherein the actual IP address is assigned by the gateway from an IP address prefix provided by the master service provider and is assigned from a first range of actual IP addresses associated with the IP address prefix, and wherein the mapping table comprises a one to one mapping of the proxy address, the proxy address being provided by an internet protocol (IP) video service provider and is assigned from a second range of logical IP addresses, and the actual IP address, the actual IP address being provided by a public Internet service provider, for each of the at least one computing device;
- substituting, by the gateway, the actual IP address with the proxy IP address;
- routing, by the gateway, the upstream data traffic to the alternative service provider utilizing the proxy IP address via the first WAN interface; and
- routing, by the gateway, the upstream data traffic to the master service provider utilizing the actual IP address upon determining not to direct the upstream data traffic to the alternative service provider via the second WAN interface.

10. The method of claim 9, wherein determining, at the gateway, whether the destination address associated with the upstream data traffic is to the alternative service provider comprises:
- examining the destination IP address of the upstream data traffic;

comparing the destination IP address to information in a route-forwarding table; and determining, based on the comparison, to direct the upstream data traffic to the alternative service provider.

11. The method of claim 10, wherein determining, based on the comparison, to direct the upstream data traffic to the alternative service provider comprises determining a match between the destination IP address and the information in the route-forwarding table.

12. The method of claim 9, wherein substituting, by the gateway, the actual IP address with a proxy IP address comprises substituting an Internet Protocol version 6 (IPv6) address with a logical IPv6 address.

13. The method of claim 9, wherein routing, by the gateway, the upstream data traffic to the alternative service provider utilizing the proxy IP address comprises routing the upstream data traffic to the public Internet service provider.

14. The method of claim 9, wherein routing, by the gateway, the upstream data traffic to the master service provider utilizing the actual IP address upon determining not to direct the upstream data traffic to the alternative service provider comprises routing the upstream data traffic to the IP video service provider.

15. The method of claim 1, further comprising routing the received downstream data traffic to the first wide area network (WAN) interface, the first WAN interface being in communication with the IP video service provider.

16. The method of claim 1, wherein receiving the downstream data traffic comprises receiving the downstream data traffic comprising video data traffic.

17. The method of claim 1, wherein creating the mapping table further comprises storing the mapping table at a routing module.

18. The method of claim 17, wherein storing the mapping table at the routing module comprises storing the mapping table at a routing module configured to be in communication with the first wide area network (WAN) interface and the second WAN interface.

* * * * *